April 30, 1957 G. T. KODAMA 2,790,970

AUDIO FREQUENCY SIGNAL TRANSFER CONTROL CIRCUITS

Filed Jan. 4, 1951 4 Sheets-Sheet 1

INVENTOR.
GEORGE T. KODAMA
BY
HIS ATTORNEY.

AUDIO FREQUENCY SIGNAL TRANSFER CONTROL CIRCUITS

Filed Jan. 4, 1951 4 Sheets-Sheet 2

INVENTOR.
GEORGE T. KODAMA

BY Arthur G. Connolly

HIS ATTORNEY.

April 30, 1957 G. T. KODAMA 2,790,970

AUDIO FREQUENCY SIGNAL TRANSFER CONTROL CIRCUITS

Filed Jan. 4, 1951 4 Sheets-Sheet 3

INVENTOR.
GEORGE T. KODAMA
BY [signature]
HIS ATTORNEY.

April 30, 1957 G. T. KODAMA 2,790,970

AUDIO FREQUENCY SIGNAL TRANSFER CONTROL CIRCUITS

Filed Jan. 4, 1951 4 Sheets-Sheet 4

INVENTOR.
GEORGE T. KODAMA
BY
HIS ATTORNEY.

United States Patent Office 2,790,970

Patented Apr. 30, 1957

2,790,970

AUDIO FREQUENCY SIGNAL TRANSFER CONTROL CIRCUITS

George T. Kodama, Dunstable, Mass., assignor to Sprague Electric Company, North Adams, Mass., a corporation of Massachusetts Application January 4, 1951, Serial No. 204,397

1 Claim. (Cl. 179—1)

This application is in part a continuation of copending application Serial No. 71,454, filed January 18, 1949, Patent 2,591,705, granted April 8, 1952.

The present invention relates to audio frequency signal transfer control circuits and to manually operable control members for such circuits.

In the past, control circuits of the above type have practically always involved the use of variable resistors which could be manually adjusted to control the intensity of the audio frequency signals transferred and thereby produce a desired intensity of reproduced sound. However these prior circuits all relied on a sliding contact between a resistive member and a movable contact finger in order to vary the signal transfer. Such sliding contact results in wear, and the wear is particularly severe when the movable contact is mechanically connected for operating an on-off switch as in most radio and secord reproducing circuits. With this type of interconnection the contact finger slides over an appreciable portion of the resistive member each time the apparatus is turned on or off. Because of this wear, the control circuit gradually becomes noisy and eventually the resistive member or entire control must be replaced.

Another difficulty with the above type of circuits is the fact that they attenuate signals in a manner that does not correspond with the response characteristics of the human ear. Accordingly, to provide a more faithful signal control, prior art circuits have been complicated by compensating networks which are usually quite elaborate.

Among the objects of the present invention is the provision of audio frequency signal transfer control circuits and elements which avoid the above and related disadvantages.

The above as well as other objects of the present invention will be more readily understood from the following description of several of its exemplifications, reference being made to the accompanying drawings wherein.

Figure 7:
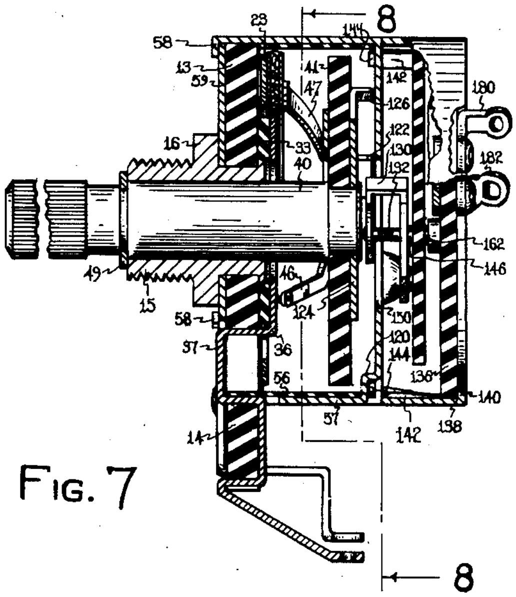
Fig. 7 is a sectional view of a manually operable control structure suitable for use in the transfer control circuits in accordance with the invention.
Figure 8:
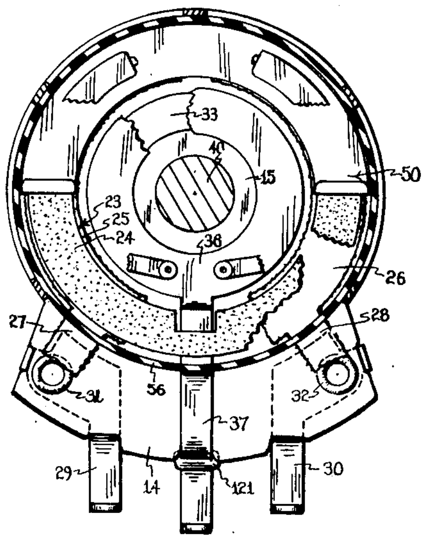
Fig. 8 is a sectional view taken along line 8—8 of the control structure of Fig. 7.
Figure 9:
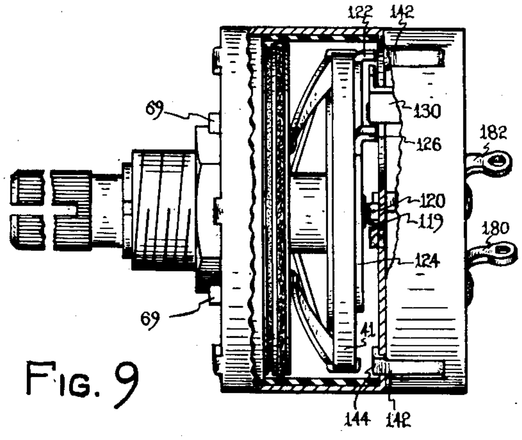
Fig. 9 is a plan view with parts broken away of the control structure of Figs. 7 and 8.
Figure 10:
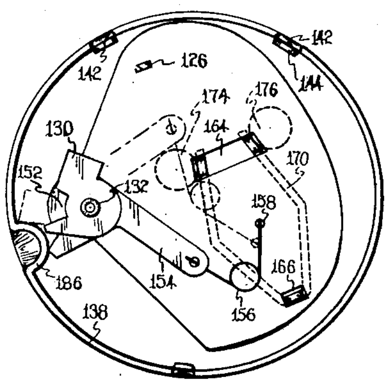
Figure 11:
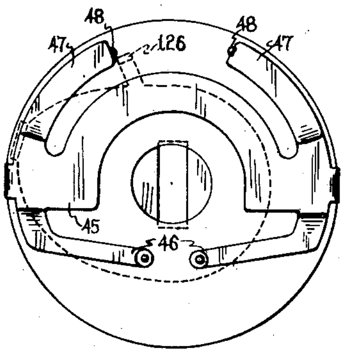
Figure 12:
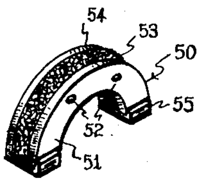
Figure 13:
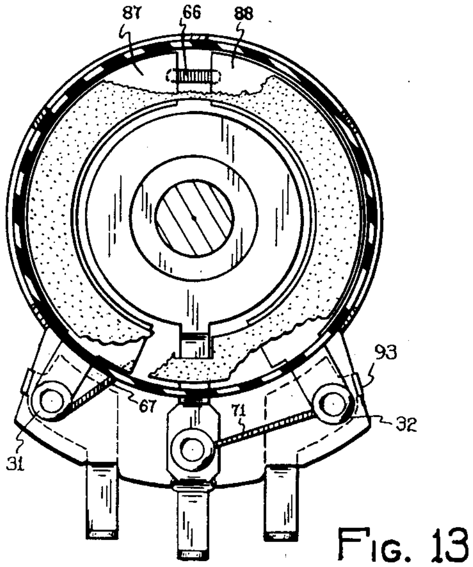
Figure 14:
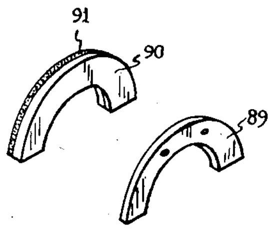
Figure 16:
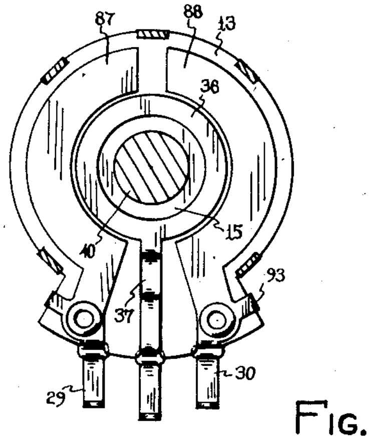
Figure 15:
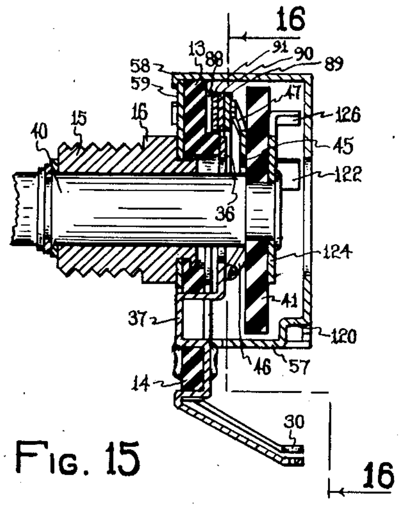
Figure 17:
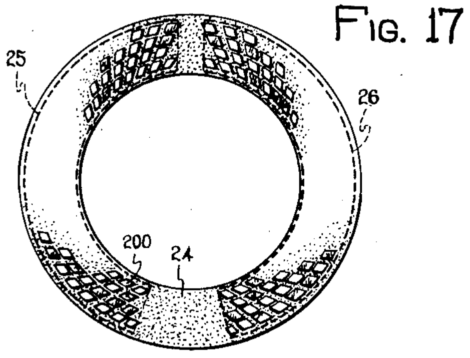
Figures 18, 19, 20, 21, 22, 23:
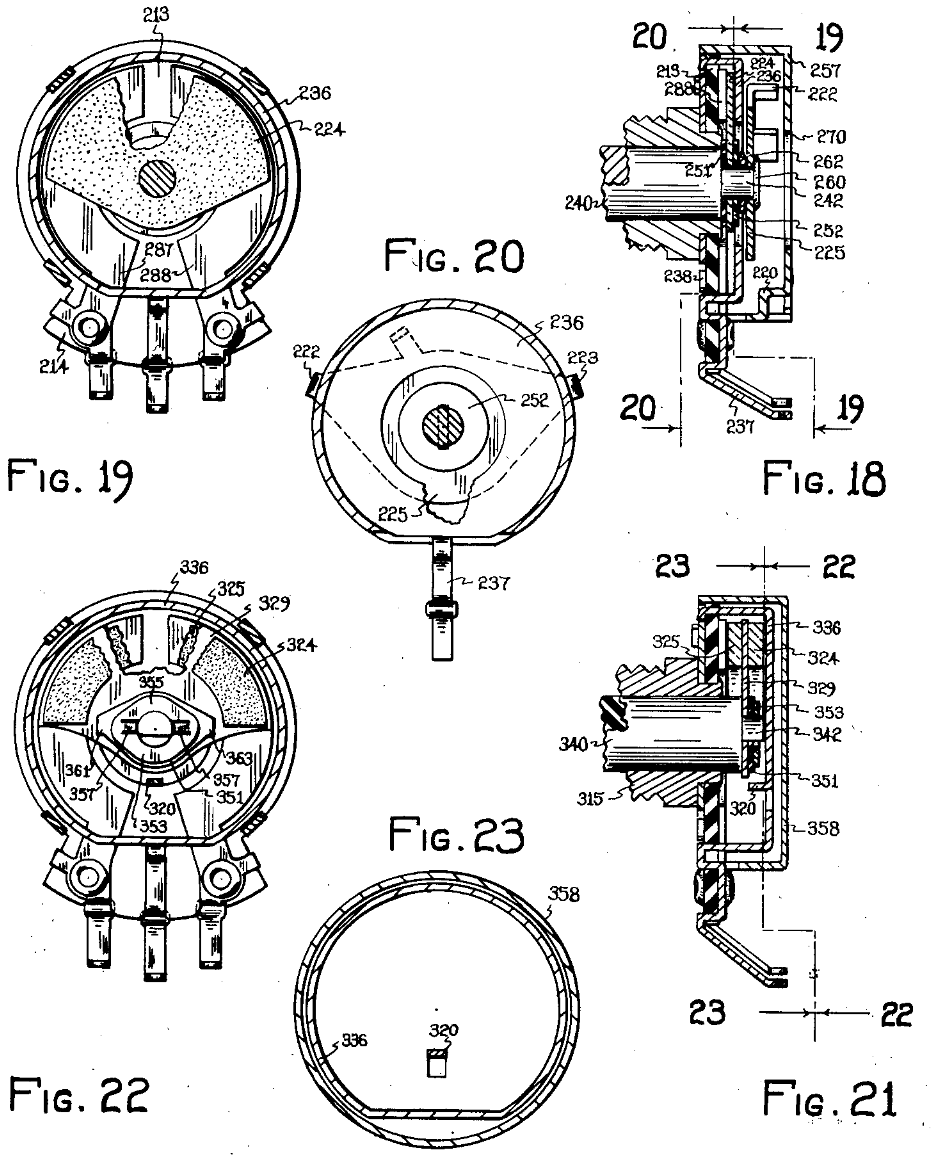

Figs. 10 and 11 are views of the control structure of Fig. 7 taken along the lines 10—10 and 11 respectively;

Fig. 12 is a perspective view of an element of the control structure of Fig. 7;

Fig. 13 is a view similar to Fig. 8 showing a modified form of control structure in accordance with the present invention;

Figs. 14, 15 and 16 are views similar to Figs. 12, 7 and 8 respectively of a different control construction embodying the invention;

Fig. 17 is a view similar to Fig. 8 of a still further modification of control construction of the invention;

Figs. 18, 19 and 20 are views similar to Figs. 7, 8 and 10 respectively of another embodiment of control structure of the invention; and Figs. 21, 22 and 23 are similar views of yet a further control structure of the invention.

In accordance with the present invention it has been found that highly effective audio frequency signal transfer or volume control can be accomplished with a circuit having a capacitive voltage divider or a pair of complementary varying capacitances connected to control the amount of the supplied signal voltage to be transferred. Such a circuit does not have a slider that movably engages a resistive element, and in fact can be devoid of any slidable electrical contact.

Figure 1:
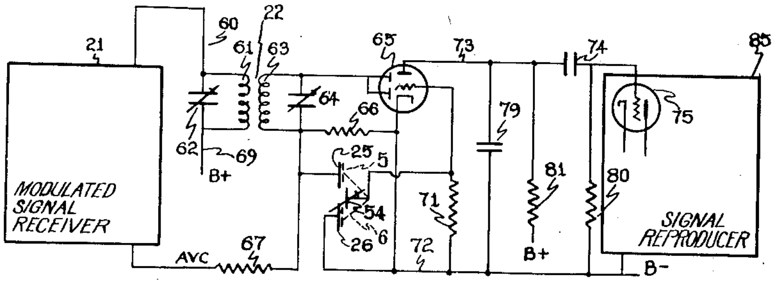
Fig. 1 is a circuit diagram, partly in block form, of a radio receiver embodying an audio frequency signal transfer control circuit of the invention.

Fig. 1 shows the essential elements of a radio receiving circuit incorporating an audio frequency signal transfer control of the present invention. A modulated signal receiving section which may be of any suitable type as indicated by the block 21, supplies modulated radio or intermediate frequency signals to the primary winding 61 of a transformer 22 by means of the conductor 60 and the usual B+ lead 69. The receiving section 21 may include an antenna and may have one or more stages of amplification for increasing the intensity of the signals developed in the antenna and may also include a heterodyne stage for shifting the received signal frequencies to a fixed intermediate frequency channel, in accordance with the well-known standard practice. A condenser 62 can be used to tune the primary winding 61 to the frequency of the supplied signal. The transformer 22 is shown as having a secondary winding 63, also tuned by a shunting condenser 64. One end of winding 63 is connected with the demodulator anodes of a duo-diode-triode electron discharge tube 65 while the other terminal of this winding is connected with the cathode of tube 65 through diode load resistor 66 to complete the circuit of the secondary winding.

Capacitor electrodes 25, 26 and 54 are provided in the form of a capacitive voltage divider in which electrode 54 can be adjusted to vary its capacitance with respect to electrode 25 and simultaneously show a complementary variation of capacitance with electrode 26. Capacitor electrode 26 is connected to the cathode end of load resistor 66 while capacitor electrode 25 is connected to the opposite end of this resistor so that the modulation signals separated by the diode rectifier section of tube 65 and developed across resistor 66, are impressed between electrodes 25 and 26. An automatic volume control lead is connected from electrode 25 through resistor 67 to the modulated signal receiving section 21 to bias the amplification stages of that section in accordance with the modulated signal level at the demodulator, as in conventional receivers. The grid of tube 65 is connected to capacitor electrode 54 and by means of resistor 71 to the B— or common return conductor 72. The plate of the triode section of tube 65 is connected through conductor 73 and coupling capacitor 74 to the grid of the next amplification stage shown as part of the signal reproducer 85 having a triode electron discharge tube 75. A capacitor 79 is connected between conductors 73 and 72, a resistor 80 connects the grid of tube 75 with conductor 72 and a B+ lead supplies electron discharge voltage to the tube 65 through resistor 81 and lead 73. The signal reproducer can have a conventional loud speaker or set of head phones connected to receiver the signal amplified by tube 75 as well as any additional amplification stages that may be incorporated in the reproducer section 85.

Although any form of bias can be provided for the triode section of tube 65, the circuit of Fig. 1 is arranged for resistor 71 to act as a conventional grid leak biasing resistor.

The functioning of the capacitor voltage divider 25, 26, 54 depends on the positioning of electrode 54 relative to electrodes 25, 26. It will be seen that electrode 25 is connected to a point of relatively high modulation signal potential, that electrode 26 is connected to the common return conductor which is considered as a conductor of reference or ground potential. Electrode 54 is arranged to have a variable capacitance with respect to electrodes 25 and 26 and accordingly develops a signal potential intermediate that of electrodes 25 and 26. The capacitance variation is represented in Fig. 1 by the dash line positions 5, 6 between which electrode 54 can be shifted. When electrode 54 is moved to position 5, its capacitance with respect to electrode 25 is at a maximum, and with respect to electrode 26 is at a minimum, so that the signal voltage on electrode 54 will approach that at electrode 25. Conversely when electrode 54 is adjusted to position 6, it has a maximum capacitance with respect to electrode 26 and minimum capacitance with respect to electrode 25, and the signal voltage in electrode 54 will approach zero, i. e. the signal potential of conductor 72. As electrode 54 is moved intermediate these two extremes, its signal voltage will depend upon the ratio of its capacitance with respect to electrode 25 and the sum of the capacitances with respect to both electrodes 25 and 26.

A feature of the present invention is the fact that as the signal intensity delivered to electrode 54 is reduced, a larger capacitance shunts this electrode with the common return conductor 72. This shunting capacitance has the effect of lowering the signal level in the higher range of the audio frequency signals more than it lowers the signal level in the lower frequencies. This automatically compensates for the characteristics of the human ear which does not respond as well to low frequency sounds of low level as it does to high frequency sounds of low level. Accordingly the volume control circuit of Fig. 1 functions as though it were compensated in tone in accordance with the volume or intensity of the reproduced signals.

Figure 2:
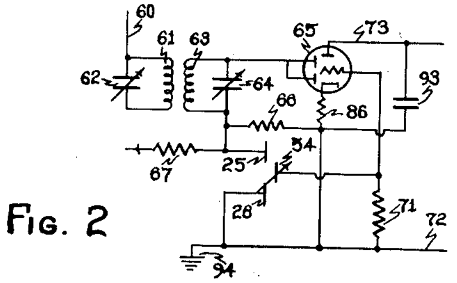
Fig. 2 is a fragmentary circuit diagram of a modified form of signal transfer control circuit of the invention that can be used in place of the one shown in Fig. 1.

Fig. 2 shows a modified form of control circuit construction in which a bias resistor 86 is inserted between the cathode of tube 65 and the return conductor 72. This takes the place of the grid lead biasing shown in the construction of Fig. 1. The circuit of Fig. 2 is otherwise similar to that of Fig. 1 except that in general resistor 71 will have an appreciably smaller resistance value in the construction of Fig. 2. Although resistor 86 forms part of the diode load as well as the amplifier input load in the circuit of Fig. 2 the desired volume-controlling action is still effected. If desired however, the resistor 86 can be shunted by a by-pass condenser to reduce its impedance to the audio signals and its loading effect on the rectifier output and amplifier input circuits.

Figure 3:
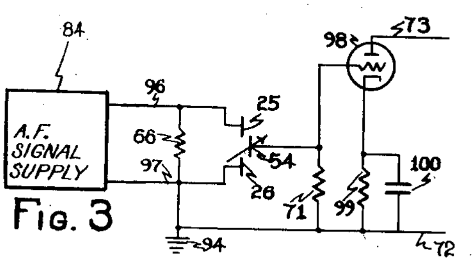
Fig. 3 is a circuit diagram, partly in block form, of a further form of signal transfer circuit in accordance with the present invention.

Fig. 3 shows a further form of the control circuit of the invention in which it is not directly associated with a detector or demodulator. An audio frequency signal supply device 84 such as a reproducing or pick-up unit of a record reproducing mechanism has output leads 96, 97 bridged by an output resistor 66. The capacitive voltage divider 25, 26, 54 is here connected to the terminals of resistor 66 and to subsequent amplification tube 98 in a manner similar to that shown in Figs. 1 and 2 except that the cathode bias resistor 99 is shunted by a by-pass capacitor 100. Common return lead 72 which is grounded as indicated at 94, is connected to input lead 97, and plate lead 73 may be connected to a signal repreducer as indicated for example at 85 in Fig. 1. The operation of this circuit is similar to that described above.

Figure 4:
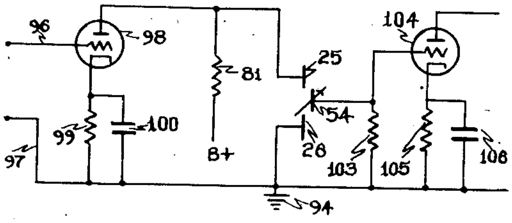

Fig. 4 shows a control circuit similar to that of Fig. 3 but connected to the output of the amplification stage including tube 98. Electrode 25 is led to the anode of tube 98 while electrode 26 is grounded and movable electrode 54 is connected to the grid of a succeeding electron discharge tube 104 and returned to ground through resistor 103. The cathode of tube 104 is returned through biasing resistor 105 by-passed by condenser 106. A feature of this construction is that no separate coupling capacitor is needed between tubes 98 and 104. The capacitive voltage divider not only effects a controllable signal transfer but provides the coupling capacitance. This eliminates one of the most annoying elements of resistor-capacitance coupled amplification stages inasmuch as the coupling capacitors ordinarily employed have relatively short lives and are likely to be the first part of the circuit to fail during use. In fact the circuit shown in Fig. 4 can be operated without any capacitances other than those embodied in the multiple network 25, 26, 54. For this type of operation it is only necessary to remove the by-pass capacitors 100, 106. Any resulting loss of amplification can be compensated for in other ways as by selecting amplification tubes showing higher effective gains, resorting to grid biasing to eliminate the cathode return resistors, or by inserting a small amount of regeneration to offset the degeneration produced by the presence of unbypassed cathode resistors.

Figure 5:
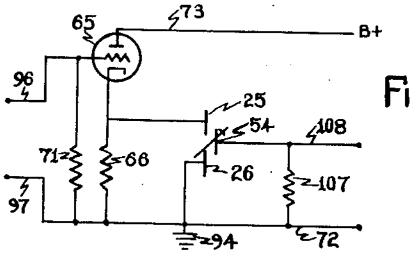

Fig. 5 shows a further form of control circuit in accordance with the present invention in which the capacitive voltage divider 25, 26, 54 is connected to the cathode follower output of tube 65 and delivers signals to a line 108 having an input resistor 107 returning to grounded common return lead 72. Here the B+ terminal is directly connected through lead 73 to the anode of tube 65 and the cathode of this tube returns through by-pass resistor 66 to the return conductor.

Figure 6:
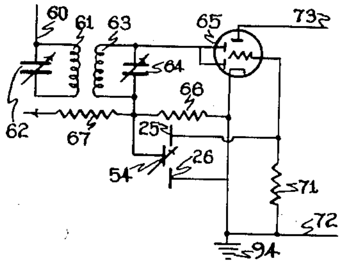
Figs. 4, 5 and 6 show still further signal transfer circuit arrangements incorporating the present invention.

The capacitive voltage divider of the present invention is also effective in delivering a controlled amount of supplied audio frequency signals even when inversely connected. Fig. 6 shows such an inversely connected control circuit portion in which the various elements are associated in the manner indicated in Fig. 1, but voltage divider electrode 25 is connected as an input lead to the grid of tube 65, electrode 26 is led to the grounded end of resistor 66, and intermediate electrode 54 is connected to the opposite end of resistor 66.

One form of manually operable control that is suitable to provide the capacitor voltage dividing elements of Figs. 1 to 6 inclusive is illustrated in Figs. 7 to 12 inclusive. As shown in these figures a dielectric support sheet 13 in the shape of a generally circular disc has a radial extension 14 and a central aperture therethrough. The aperture receives one end of a bushing 15 having a flange 16 engaging one face of the insulating member 13 and the penetrating end of the bushing is riveted or clinched over to securely grip this member. The bushing is externally threaded to receive a nut (not shown) by which the entire structure may be mounted on a base (also not shown).

A capacitor element generally designated 23 (see Fig. 8) is mounted on one side of the insulating support member 13 and comprises an annular dielectric 24 preferably of high dielectric constant ceramic material with conductive coatings 25, 26 on one side thereof, which coatings are in the form of spaced segments of an annulus. The coatings can be conductive paints applied to the dielectric or the support member. Suitable examples of conductive coatings are described in National Bureau of Standards circular 468 entitled "Printed Circuit Techniques" and dated November 15, 1947, pages 5 to 14 inclusive. The coatings 25, 26 are severally connected as by similar coating strips 27, 28 carried by the insulating member 13 and extending about terminal-receiving apertures in the insulating member portion 14 for conductive connection with terminals 29, 30 fixed to such portion 14 by eyelets 31, 32. The dielectric 24 is positioned about the central aperture in member 13, and is held in place by the adhesive action of the paint coatings 25, 26.

A conductive contact ring 36 is mounted on a flange or washer 33 on insulating member 13 concentric with and adjacent the bushing 15. This ring has a radial extension 37 interlocked with dielectric disc 13 to hold the ring in position in spaced relation to the capacitor element 23. The ring and its extension 37 form a terminal for a capacitor electrode as explained below.

A rotor member comprises a shaft 40 mounted in bushing 15 and having a split and splined outer end as is usual for receiving an operating knob (not shown). The other end of the shaft 40 has fixed thereon a disc 41 of insulating material carrying a contact member generally designated 45 (see Fig. 11) and formed with a pair of resilient contact fingers 46 slidable on the contact ring 36 and with a pair of resilient fingers 47 with prongs 48 at the ends thereof for a purpose to be described. The contact fingers urge the shaft 40 in one axial direction but such movement of the shaft is prevented by a snap ring 49 acting between the bushing and a groove in the shaft.

The contact fingers 47 rotatably engage a capacitor rotor sub-assembly generally designated 50 and comprising (see Fig. 12) an arcuate metallic member 51 in the form of a segment of an annulus, having a width and a finished length substantially the width and length of the individual conductive coatings 25, 26. The member 51 is provided with prong-receiving holes 52 therethrough, and serves as a backing for a similarly shaped and dimensioned pad 53 of a resilient material such as felt, rubber, etc., of considerable thickness. The pad supports a flexible metallic foil 54 also of the general shape and size of the backing plate 51 and the pad 53. The metal foil is attached to the backing plate as by tabs 55 to join the rotor sub-assembly parts and to electrically connect backing 51 and foil 54.

The contact member prong fingers 48 pass through the backing plate holes 52 to engage in the pad and wedge in the holes so that the rotor sub-assembly 50 is moved by shaft 40 and the resilience of such fingers plus the resilience of wad 53 presses the foil 54 closely into contact with the stator plates 25, 26. In addition the resilient shifting of the prongs 48 as a result of the compression of the fingers 47 jams the prongs against the margins of the holes 52 thereby eliminating all looseness or free play during rotation. The spacing of holes 52 can be arranged to secure a uniform distribution of pressure on backing plate 51 and through pad 53, on metal foil 54. Contact arms 46, 47 provide a conductive connection between rotor sub-assembly 50 and stator ring 36.

The pad may be impregnated with a suitable moisture repellent such as a liquid silicone (organo-substituted polysiloxane) or hydrocarbon oil. The impregnating compound should be non-vaporizable under the conditions of use of the radio receiver or other apparatus in which the control is used, and should have good insulating properties. The compound should also be inert to the various materials used in the unit and to the atmosphere. Such compound may also serve as a lubricant between the dielectric 24 and rotor plate 54 to minimize wear.

It will thus be seen that coatings 25 and 26 severally form capacitors with foil 54 and that the capacitors so formed will show complementary variations dependent on the position of plate 54 relative to plates 25, 26. It will be understood that more than two fixed plates may be provided so that other capacitor combinations may be had for use in circuits requiring a multiplicity of such combinations.

The structure above described is preferably enclosed in a casing or cover 57 having ears 58 which may be bent over and interlocked with notches in a metallic plate 59 held between insulator 13 and bushing flange 16. The enclosed parts are thus protected from damage and shielded against interference because plate 59 conductively connects cover 57 with bushing 15 which is usually grounded. To fix the plate 59 against rotation with respect to the bushing, it may have upstanding ridges 69 shaped to interlock with the angular periphery of flange 16, as shown more clearly in Fig. 9. If desired a dielectric insulating strip 56 can be fitted within the cover 57 to assure that the cover does not come in contact with the dielectric 24 or any of the related components.

Rotation limiting structure or stops are advantageously provided to prevent the unrestricted rotation of the rotor assembly and to simplify its use to diminish the intensity of transferred signals without any possibility of inadvertently overshooting the low signal limit with the consequent blaring out of the transferred signals at maximum intensity. For this purpose two detents 120, 119 can be struck inwardly from cover 57 to an extent sufficient to catch and obstruct the passage of an ear 122 on an auxiliary plate 124 fixed to shaft 40 along with the rotor disc 41. One detent can be so located to stop ear 122 from continued counterclockwise rotation when the capacitor electrodes are in minimum signal transfer position, and the other detent can be arranged to limit the clockwise rotor rotation when the electrodes are in maximum transfer position. Other stopping positions can also be used however.

It is advantageous to attach to the volume control in the combination of the present invention, a switch operated by shaft 40 as in the conventional on-off switches usually provided with volume control potentiometers, to reduce the number of external manipulatable controls that are required. For this purpose plate 124 can be provided with an additional ear 126 that cooperates with any suitable switch tripping mechanism such as the conventional type shown in more detail in Figs. 7 and 10. This construction includes a U-shaped trip lever 130 having both arms of the U pivoted on a stud 132 staked to a dielectric plate 136. This dielectric plate is carried within a generally cylindrical housing 138 between a flanged over end 140 and a series of inwardly pressed ribs 142. These ribs are conveniently provided with extension fingers 144 which fix the on-off switch section in place by being received in suitably located slots in casing 57 and being clinched over. To prevent the plate 136 from rotating within its cylindrical housing 148, a detent similar to that shown at 120 can be punched inwardly from the housing to interlock with a corresponding notch in the plate.

The lever 130 is rotatably held on stud 132 between a shoulder 146 and its enlarged or riveted-over head. The outer arm of the U penetrates through an opening 150 in casing 57 and includes a cutaway pocket 152 by which lug 126 operates the lever. Toggle or overcenter action is provided by an arm 154 extending out from the inner section of 130 having an outer perforation in which is received one hooked end of a coiled over-center spring 156. The other end of this spring is also hooked and fitted in a perforation 158 of a switch plate 160 pivoted on stud 132 over a shoulder 162 below the switch lever shoulder 146. Slots 164 and 166 in switch plate 160 receive upstanding fingers of a U-shaped switch contact 170 which is thereby engaged for movement with the switch plate as it pivots on the stud. A pair of fixed switch contacts 174, 176 are shown as rivets anchored to plate 136 and holding external terminals 180, 182 in place on this plate. To limit the rotation range of switch lever 130 a portion of housing 138 is pressed inwardly adjacent stud 132 to provide a suitable stop 186 against which the inner section of lever 130 strikes.

In operation the switch assembly is arranged to have its switch contacts moved in and out of circuit closing position when the volume control is rotated in the 20 or 30 degrees rotation range adjacent the extreme counterclockwise limit. The circuit closing position is shown in full lines in Fig. 10. Upon counterclockwise rotation of the shaft 40, lug 126 is brought into engagement with the counterclockwise wall of pocket 152, and further counterclockwise rotation of the shaft will rotate switch lever 130. When this lever brings its end of spring 156 past the line of centers between perforation 158 and stud 132, the uncoiling action of spring 156 will propel the switch lever to the dash line position shown in Fig. 10 where it engages stop 186, and also impels switch plate 160 to its extreme clockwise position against housing 138 thereby withdrawing movable contact 170 from against fixed contacts 174, 176, and opening the switch circuit. Upon rotation of the shaft 40 in the clockwise direction again, the lug 126 which is now in pocket 152 is first brought into engagement with the clockwise wall of the pocket after which it flips the lever 130 back to the full line position shown in Fig. 10 closing the switch circuit.

To more securely anchor terminal 37 against the support disc 13, the terminal may be provided with retaining wings 121 which engage one surface of the disc adjacent a notch through which this terminal fits. Other protuberances can also be provided on this terminal if desired to assist in holding it properly positioned or to engage and hold the dielectric ring 24 against the base 13.

Fig. 13 shows a modified form of signal transfer control of the present invention. Here an electrically resistive coating 66 is shown as connecting two fixed capacitor electrodes 87, 88 which in this embodiment are in the form of metal plates or foils anchored under the heads of rivets 31, 32. In addition to the above, resistance strips 71, 67 can also be applied as shown to combine the corresponding circuit element of the construction shown in Figs. 1 and 2. Suitable examples of such resistive coatings are shown in the above-identified National Bureau of Standards circular 468 on pages 7, 8, 9, 14, 15 and 16. Some or all of these added resistive strips 66, 67, 71 may be omitted if desired or alternatively these strips can be applied to the control shown in Figs. 7 to 12 inclusive. To assist in positioning electrodes in the form of plates 87, 88, these plates may have marginal tongues 93 projecting into suitable sockets in the dielectric backing disc 13.

Figs. 14, 15 and 16 show a further embodiment of a signal transfer control in accordance with the present invention. Like parts are here indicated by the same reference numerals used in connection with the embodiments of Figs. 7 to 13 inclusive. Stationary capacitor plates 87, 88 are shaped as spaced segments of an annulus and are formed on or placed upon the supporting disc 13. Where the plates 87, 88 are of self-supporting construction, other elements such as sheet metal terminals 29 and 30 can be made as integral portions of the respective plates. However the electrodes can also be formed in place as by metal spraying, or by electrolytically depositing conductive metal coatings on portions of disc 13 that are suitably prepared with applications of graphite for example. On the other hand an integral metal foil can be bonded to the entire surface of support disc 13 as by cementing, and then can have portions removed to leave the desired strips, using the conventional photoetching processes as shown for example in Lokker et al. U. S. Patent No. 2,506,604 granted May 9, 1950. Positioning tongues 93 for interlocking with suitably located notches on disc 13 are only needed for the self-supporting type of electrode plates.

The movable or rotor plate sub-assembly in the present embodiment comprises a backing plate 89, a conductive plate 90 and a dielectric 91 mounted on the conductive plate and on the backing plate for movement therewith over the stationary capacitor plates 87, 88. The rotor plate 89 is fixed to rotor plate 90, 91 as by soldering or by the use of a conductive cement. It will be seen that the rotor sub-assembly is approximately one-half an annulus so that approximately one-half of the stationary plates can be simultaneously overlapped by the conductive rotor plate. In the present rotor sub-assembly, the conductive plate 90 may be either a separate member or may be formed on and bonded to the dielectric which is preferably a ceramic as above described. Resilient contact fingers 47 mechanically engage with the backing plate 89 and electrically engage movable capacitor plate 90. However where the backing plate is of electrically conductive material, the mechanical engagement will by itself also supply the electrical connection.

The forming of the capacitor electrodes directly on the ceramic capacitor dielectric as for example by using the conductive paint of the construction of Fig. 8 provides somewhat higher capacitance between the opposed electrodes. This capacitance can be further increased by also forming portions of the movable electrode directly on the opposite side of the ceramic disc. Fig. 17 shows such a construction in which an annular ceramic disc 24 has on one face the fixed terminal electrodes 25, 26 and on the other face a multiplicity of separated dot-shaped electrically conductive coating portions 200. These dots are distributed so as to extend over an area opposite electrodes 25, 26, and are engaged by a rotor contact such as the one shown at 50 in the construction of Figs. 7 to 12 inclusive. The sliding face 54 of the rotor contact engages all the dots 200 along a section corresponding to the dielectric at the position of the rotor so that the engaged dots become effectively an efficiently positioned portion of the intermediate electrode of the capacitor assembly. Shifting of the rotor causes the contact face 54 to move to a different location where a different set of coating dots become so connected. The construction of Fig. 17 is accordingly operated in the manner described above in connection with Fig. 1. In order to reduce noise that may be generated by the shifting of the rotor face and the resulting disconnection of some dots and the connection of others, the dots may be distributed in a pattern having poor radial symmetry, such as the one shown in the figure. This has the effect of reducing the number of make and break connections that are made at any one time by a rotor surface having radially directed edges. A similar effect can be obtained by scattering the dots in a random distribution. The particular shape of the individual dots can be subject to wide variation examples of which are circular, triangular, rectangular, polygonal, linear and irregular geometric shapes. However dots in the shape of annular segments can be arranged to give the maximum proportion of high efficiency electrode surface by reason of the uniformly small spacing that can be kept between them.

Figs. 18, 19 and 20 show a further embodiment of signal transfer control in accordance with the present invention. Here slidable contacts are entirely eliminated. In this construction a pair of terminal electrodes 287, 288 are held on a dielectric supporting disc 213 having an extension 214 in a manner similar to that shown above in Fig. 16. An intermediate electrode is also fixed in place opposite the first two electrodes and in Figs. 18 and 20 is shown as a metal cup 236 having spaced ears 238 piercing the supporting disc 213 and clinched over on the side opposite the bodies of the electrodes. Cap 236 also has a tail 237 which is held in place against the disc in a manner similar to those shown above. The cup includes conducting portions that extend opposite substantially all parts of the terminal electrodes 287, 288.

The rotor shaft 240 which may otherwise be similar to that of Fig. 7, carries at its reduced inner end 242 a segmentally shaped dielectric 224 clamped between a pair of protective washers 251, 252 by an upset or staked-over end head 260. To assure secure clamping of the dielectric, a spring washer 262 may be interposed between the dielectric and the shoulder or head of the shaft end, or between these metals and a protective washer which may be of relatively non-frangible material such as vulcanized fiber or plastic. The entire electrode assembly can be surrounded by a casing 257 as in the above-described construction and this casing can also be provided with a detent stop 220 to cooperate with a pair of stop lugs 222, 223 on a plate 224 also anchored on the reduced rotor end 242. Where the control assembly is to be used with an on-off switch the casing 257 can have an aperture 270 and the plate 224 an additional appropriately positioned switch operating lug as shown above. To more securely position the dielectric 224, it can be shaped to interlock with a non-circular portion of shaft end 242.

The operation of the construction of Figs. 18, 19 and 20 depends upon the fact that the ceramic dielectric 224 can be made to have a dielectric constant as high as 3500 or higher. Accordingly there will be a much greater capacitance between opposed electrodes 288, 236 when as much as possible of the space between these electrodes is occupied by the ceramic segment. This follows from the fact that the capacitance of a condenser varies in proportion to the dielectric constant of the condenser dielectric. In other words when the ceramic is in the extreme clockwise position, as viewed in Fig. 19, the capacitance between electrodes 287 and 236 will be several thousand times as high as when the ceramic is withdrawn from between these electrodes, if the air space between the several elements is neglected. This air space will reduce this figure somewhat but the presence of the dielectric 224 will still provide practically all the capacitance and this capacitance will depend upon the positioning of the dielectric.

Figs. 21, 22 and 23 show a still further form of control in accordance with the present invention. In this form sliding contacts are also eliminated. Here however the dielectric is provided with a more sturdy and shock resisting mounting by means of a metal carrier sheet 329. The dielectric is divided into two annular segments 324, 325, each of which is soldered or sweated on opposed portions of the carrier sheet. To do this the segments 324, 325 are conveniently provided on one face with a fired layer of silver, and sheet 239 is made of a readily solderable metal such as copper, brass, zinc, etc. A small amount of solder will readily wet the fired silver coatings and unite them to the carrier sheet.

The sheet so assembled is shown as held on a rotor shaft 340 having a reduced end 342 over which the sheet is slipped and on which it is held by washer 351 and a friction holder 353. To assure proper alignment between the dielectric segments and the shaft 340, the shaft extension 342 can be flattened at one side and the carrier sheet correspondingly shaped to provide an interlocking fit. The friction holder 353 can be of the conventional spring metal construction having a generally flat base 355 with an aperture through which shaft extension 342 fits, and a pair of tooth portions 357 somewhat longer than is sufficient to extend to the edge of the aperture. When this holder is pushed over the shaft end the teeth, being too long, are bent outwardly and dragged somewhat behind the base 355. When the holder is fully fitted it will be found that the teeth 357 do not permit its withdrawal but have bit into the shaft end and securely hold the assembled parts in fixed relation.

To prevent grounding of the carrier sheet 329 against externally grounded conductive portions of the control such as bushing 315, the shaft 340 can be made of dielectric material. Control stops are readily provided by shaping intermediate cup shaped electrode 336 so that it includes an inwardly projecting stop lug 320, and extending portions of washer 351 to form stop arms 361, 363. The construction is otherwise generally similar to that of Figs. 18, 19 and 20. A casing 358 is advantageous and can be perforated to cooperate with an on-off switch if desired.

As an example of a highly effective volume control construction in accordance with the present invention a ceramic dielectric composed of a fired mixture of 23% barium titanate and 77% strontium titanate and having a dielectric constant of 3500 was found to provide a maximum capacitance of 400 micro-microfarads when in the form of an annular disc as shown in Figs. 7 to 12 inclusive, having an outer diameter of 13/16 of an inch and an inner diameter of 17/32 of an inch, with a thickness of 12 to 14 mils. With the remainder of the volume control constructed as shown in Figs. 7 to 12 inclusive, the minimum capacitance is 30 micro-microfarads and is chiefly composed of stray capacitances. This volume control was found to operate extremely satisfactorily in radio receivers in which it is connected in the input circuit of grid-leak biased amplifiers, as illustrated in Fig. 1, with a grid return resistor 71 of 5 to 15 megohms and tube 65 of type 6SQ7, 6AT6 or 6AV6. The control also operates as well when it delivers its output to an amplifier input circuit having as little as 0.5 megohm impedance, as in the circuit of Fig. 3, for example. The demodulator anodes of Figs. 1, 2 and 6 need not be incorporated in the same tube envelope as the subsequent amplifier, but may be included in a previous audio frequency or radio (intermediate) frequency amplifier or may be separately provided by an independent rectifier tube or dry rectifier, without affecting the operation of the present invention. A 250,000 ohm load 66 is suitable.

The controls and circuits of the present invention can also be used for signal circuits of the type embodied in frequency modulation receivers and detectors as well as in signal contrast controls for television receivers and pulse modulation signal receivers of all kinds.

The capacitance-contributing dielectrics of the capacitance voltage divider can be assembled from separate small portions each extending over only a portion of the desired total area of capacitor electrode. The individual dielectric portions can be united by cementing or sweating to a common base. Thus in the construction of Fig. 8, the conductive paint will provide the desired cementing.

As many apparently widely different embodiments of this invention may be made without departing from the spirit and scope hereof, it is to be understood that the invention is not limited to the specific embodiments described above, except as defined in the appended claim.

What is claimed is:

An audio frequency signal transfer circuit having a pair of signal input conductors connected to an audio frequency electric signal supplying device, and a pair of signal output conductors connected to a signal reproducing device for transducing electric signals into sounds, a manually operable signal transfer control connected to control the proportion of incoming signal that is transferred from the input conductors to the output conductors, said transfer control having three capacitor electrodes capacitively interconnected by means of high dielectric constant titanate ceramic material to provide a capacitance between a first and a second of the electrodes that varies in response to manual control operation and a complementary varying capacitance between the second electrode and a third electrode, the first and third electrodes being conductively connected respectively to one of said pairs of conductors, and the second and third electrodes being connected to the other pair of conductors, the first and third electrodes are fixed in place as an adjacent pair and the ceramic material is in the form of a dielectric segment movably held by manual control means for controllable insertion between the electrodes, the segment being shaped to substantially overlap only one electrode of said pair, the control means being connected to withdraw the segment from the first electrode as it is moved to overlap the third, and to withdraw it from the third as it is moved to overlap the first.

References Cited in the file of this patent

UNITED STATES PATENTS

| | | |
|---|---|---|
| 1,620,020 | Hardy | Mar. 8, 1927 |
| 2,106,336 | Anderson et al. | Jan. 25, 1938 |
| 2,145,372 | Riddle | Jan. 31, 1939 |
| 2,309,068 | Hermansson | Jan. 19, 1943 |
| 2,326,341 | Ehlers | Aug. 10, 1943 |
| 2,361,657 | Schock | Oct. 31, 1944 |
| 2,386,651 | Bisson | Oct. 9, 1945 |
| 2,474,988 | Sargrove | July 5, 1949 |

FOREIGN PATENTS

| | | |
|---|---|---|
| 329,747 | Great Britain | May 29, 1930 |
| 849,954 | France | Aug. 28, 1939 |